No. 873,461. PATENTED DEC. 10, 1907.
M. SIZAIRE & L. NAUDIN.
CHANGE SPEED GEAR.
APPLICATION FILED FEB. 28, 1906.

3 SHEETS—SHEET 1.

WITNESSES
INVENTORS
Maurice Sizaire
Louis Naudin
BY
Howson and Howson
ATTORNEYS

No. 873,461. PATENTED DEC. 10, 1907.
M. SIZAIRE & L. NAUDIN.
CHANGE SPEED GEAR.
APPLICATION FILED FEB. 28, 1906.
3 SHEETS—SHEET 2.
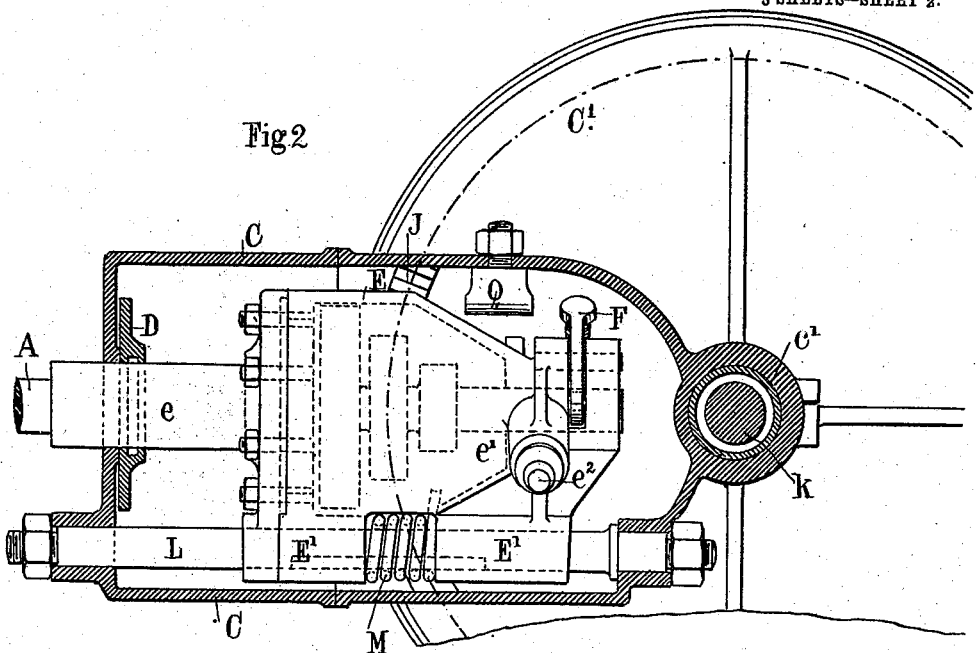
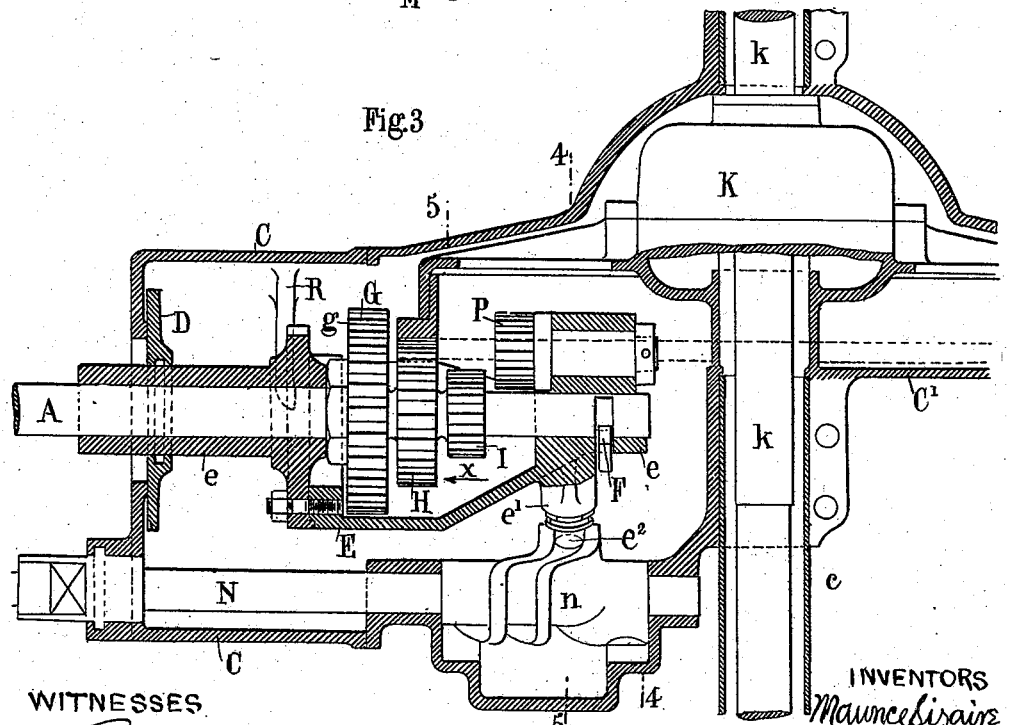

No. 873,461. PATENTED DEC. 10, 1907.
M. SIZAIRE & L. NAUDIN.
CHANGE SPEED GEAR.
APPLICATION FILED FEB. 28, 1906.

3 SHEETS—SHEET 3.

WITNESSES
Paul A. Blair
Walter Abbr

INVENTORS
Maurice Sizaire
Louis Naudin
BY Howson and Howson
ATTORNEYS

UNITED STATES PATENT OFFICE.

MAURICE SIZAIRE AND LOUIS NAUDIN, OF PUTEAUX, FRANCE, ASSIGNORS TO SOCIÉTÉ DES AUTOMOBILES SIZAIRE ET NAUDIN, OF PARIS, FRANCE.

CHANGE-SPEED GEAR.

No. 873,461.      Specification of Letters Patent.      Patented Dec. 10, 1907.

Application filed February 28, 1906. Serial No. 303,443.

*To all whom it may concern:*

Be it known that we, MAURICE SIZAIRE and LOUIS NAUDIN, both citizens of the French Republic, and residing at 24 Rue Godefroy, Puteaux, Seine, France, have invented a certain new and useful Improvement in Change-Speed Gear, of which the following is a full, clear, and exact description, and for which we have applied for Letters Patent in France, dated March 4, 1905, (not issued;) Germany, July 29, 1905; Belgium, December 7, 1905.

This invention relates to a change-speed transmission gear intended more particularly for motor carriages of the type with longitudinal propeller shaft and live axle; this mechanism affords what is known as direct drive on all speeds.

The invention may also be applied to bicycles, motor cycles and similar vehicles.

The invention has reference to a change speed gear having a plurality of wheels driven by the source of power, any one of these wheels being able to be engaged with and to drive a wheel mounted upon the driven shaft.

We prefer to arrange the driving pinions so that in changing from one gear to another the pinion may first be withdrawn from the face of the driven wheel, then moved laterally away from the driven wheel and another pinion then engaged with the driven wheel. The shaft upon which the pinions are mounted has thus both a longitudinal sliding movement and a lateral movement to or from the teeth of the driven wheel.

The invention also provides a special mechanism for imparting this double movement to the slidable shaft and for a reverse gear and also has reference to details of construction and combinations of parts which will be hereafter set forth.

The invention is described with reference to the annexed drawings, in which:—

Figure 1:
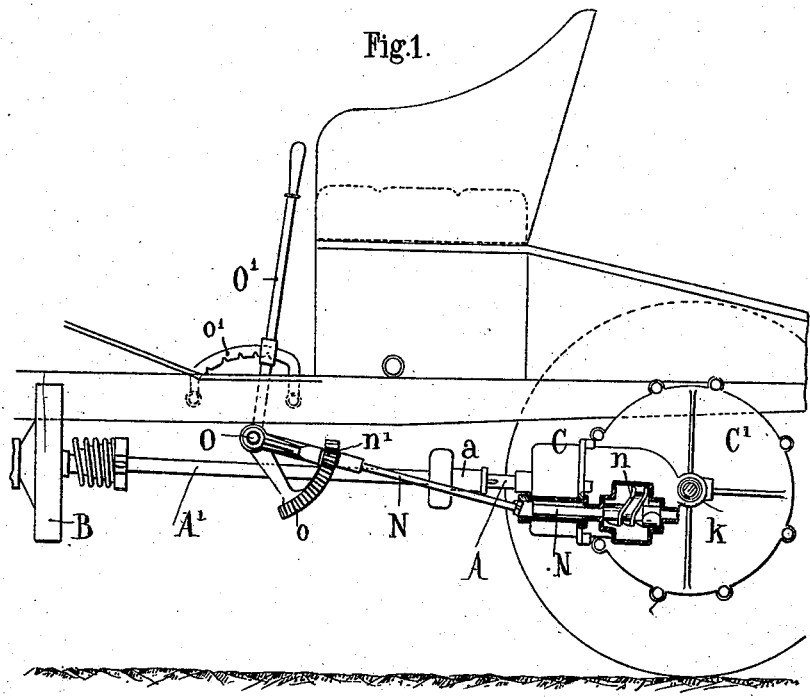
Figure 6:
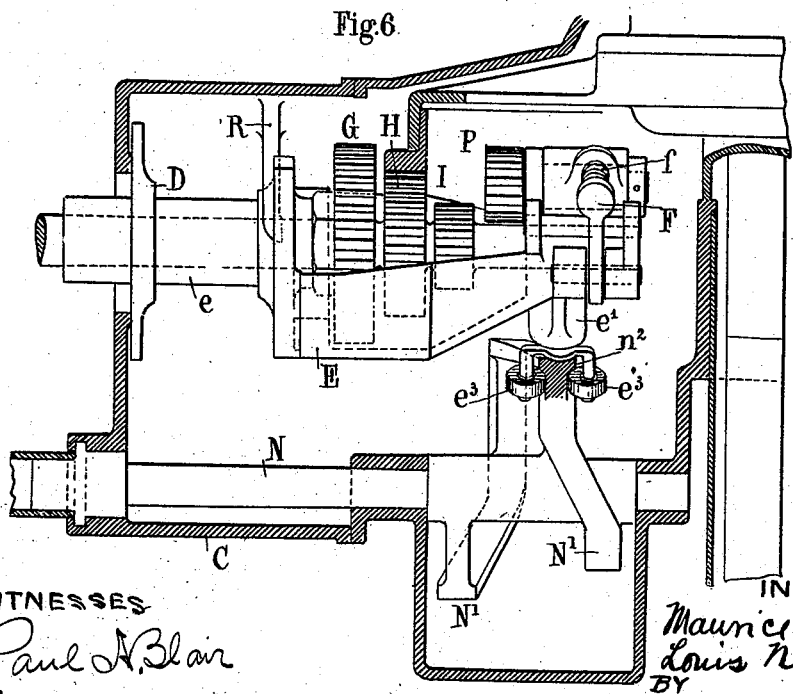
Figure 4:
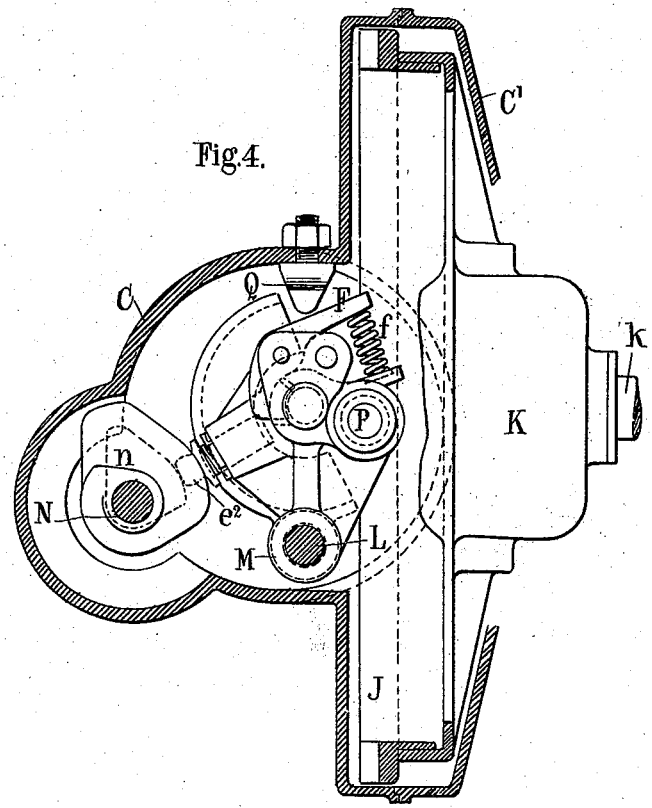
Figure 5:
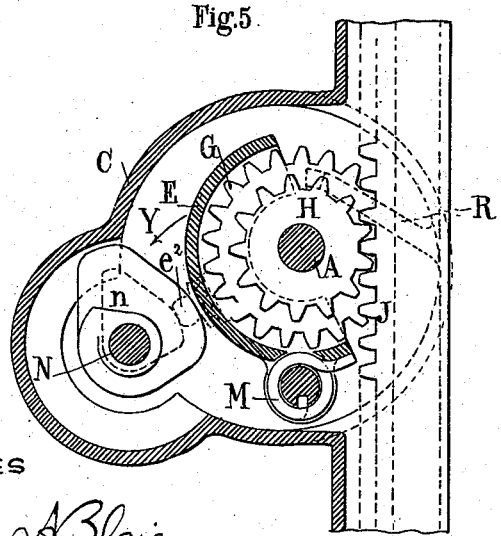

Figure 1 is an elevation of a motor car provided with this transmission gear and showing the latter complete. Figs. 2, 3, 4 and 5 represent the gear-box secured to the tubular casing or bridge of the driving axle and containing the speed changing and reversing mechanism as well as the differential gear. Fig. 2 is a side elevation thereof, the speed-changing and reversing gearbox being in section. Fig. 3 is a horizontal section. Figs. 4 and 5 are transverse sections upon lines 4—4 and 5—5 of Fig. 3. Fig. 6 relates to a modification of the operating cam for the changing of gear.

This transmission gear, which in the example illustrated comprises three speeds and reverse, affords for each of these three speeds what is known in the industry as the direct drive.

This gear is designed for the usual type of motor car in which the drive takes place by means of a shaft placed in the direction of the length of the vehicle, and extending from the clutch mechanism by which it may be connected to the motor as far as the gear box forming part of the tubular sleeve or bridge of the axle of the driving wheels so as to be connected to the differential gear casing of this axle.

The transmission gear that is the object of the invention is characterized essentially by the longitudinal driving shaft having a universal joint and having at the part adjacent to the axle of the driving wheels a sliding member with several spur pinions, by one or other of which pinions it may be meshed with a toothed crown secured to the differential casing; this toothed crown is a circular rack and the driving shaft carrying the sliding member is connected to a cam operating device, by means of which the said sliding member may be struck so as to mesh one or other of its pinions with the toothed crown; the entire shaft with its sliding member suffers at the time of changing gear a lateral displacement by which the sliding train of pinions is completely disengaged from the differential crown-wheel so as to allow the longitudinal movement by which the drive is transferred from one pinion to the other.

The shaft $A\ A^1$ extends rearwardly from the clutch represented at B; in the usual manner it is furnished at suitable points in its length with universal or Hooke joints of any desired pattern; this shaft is constructed in two parts $A\ A^1$ connected together by a muff $a$ which may form one of the universal joints and allows longitudinal movement of the part A relatively to the part $A^1$, although securing them against relative rotation; the sliding member G H I mentioned above does not therefore slide upon the shaft A but is attached to it and moves therewith.

The shaft A enters the gear box C which incloses all the gear changing mechanism and forms part of the case $C^1$ surrounding the differential and secured to the tubular sleeve $c^1$ in which the axle $k$ of the driving wheels is inclosed; the entry of the shaft A into the gear box C is through an opening large enough to allow the lateral displacement of the shaft A necessary for the operation of changing gears and this opening is sealed by a movable cover-plate D.

Upon the part of the shaft A inclosed within the gearbox C is engaged a housing E mounted upon the said shaft by two bearings $e\ e$. This housing E is connected to the shaft A by means of a bolt or catch formed by a finger F which under the influence of a spring $f$ engages a circular groove in the shaft.

The shaft A carries three spur pinions G H I secured integrally thereto, and of which, as hereafter explained, one or other according to the speed ratio desired is meshed with the toothed crown J fast to the differential K of the axle $k$ of the driving wheels. This toothed crown J of which the teeth are at right angles to the axle $k$ is not, strictly speaking, a gear wheel, but more accurately a circular rack; admittedly this arrangement of transmission by spur pinions and circular rack is theoretically inferior to transmission by bevel pinion and bevel wheel employed as a rule in cars with transmission by longitudinal shaft, live axle and separate change speed box, but by virtue of the great difference of diameter between the pinions and the circular rack, it affords an approximation and an efficiency which are in practice quite satisfactory. A suitable part of the wall of the housing E is cut away to allow the engagement of the sliding pinions G H I with the crown J of the differential.

The housing E carries two lugs $E^1\ E^1$ by which it is guided in its movement upon a slide-bar L secured in position in the gear box C, and upon this bar L is engaged a spring M the function of which is described hereafter.

On a boss $e^1$ upon the housing E is attached a roller $e^2$ engaged in the groove of a cam $n$ secured to a shaft N journaled in the gear box C and capable of receiving a movement of rotation by fractions of a turn, effected by the operation of a lever placed within reach of the driver of the car; for this purpose (see Fig. 1) the shaft N carries a bevel pinion $n^1$ gearing with a toothed sector $o$ suitably secured to a shaft O to which is attached the operating lever $O^1$. The movement of the latter is guided by a sector $o^1$, of which the notches correspond to the different positions of the shaft N with its cam $n$ and therefore to the different gearings or speeds.

The roller $e^2$ is engaged in the groove of the cam $n$ in such a manner as to be connected to the latter without possibility of detachment therefrom, and likewise in consequence the housing E and the sliding shaft A with its set of pinions.

The spring M above mentioned acts by torsion and tends to revolve on the shaft L in the direction Y (Fig. 5) the housing E with the shaft A, that is to say, tends to separate the sliding shaft and pinions G H I from the toothed crown J of the differential.

At any convenient point in the housing E is journaled a pinion P which is the intermediate or idler pinion to obtain the reverse; for the operation of changing gear the housing E with its shaft A as above described can undergo a longitudinal displacement; at a point in this movement the catch-device F which renders the housing E fast to the shaft A, contacts with a fixed tappet Q and the set of pinions G H I contact at the side face $g$ of the pinion G with a fixed stop R.

The working of the mechanism is as follows:—The shape of the cam $n$ is determined so that the various fractions of its rotation under the control of the lever $O^1$ effect the movement of the housing E with the shaft A so as to bring the three pinions G H I successively in mesh with the toothed crown J. This is effected for the passing from meshing one pinion to meshing another, by imparting a lateral movement to the housing E with its shaft A so that the set of wheels G H I is completely disengaged from the toothed crown J. The cam is so designed as to cause this lateral movement before and after each change, in such a way that the passage from one gear to the other comprises (firstly) a lateral displacement to free the pinion which is in mesh with the crown J, (secondly) a longitudinal movement of the housing E with the shaft A and the pinions G H I in order to bring the succeeding pinion in front of the crown and (thirdly) a further lateral displacement to engage the new pinion with the drive, all these movements resulting from the profile of the cam $n$. This arrangement thus allows the direct drive to be obtained for all speeds.

The reverse is obtained as follows:—The housing E is by the operation of the cam $n$ moved in the direction $x$, until the catch F and the face $g$ of the sliding member G H I make contact respectively with the fixed stops Q and R; when the catch F encounters the tappet Q it disengages from the shaft A so as to free the latter from the housing E; at the same time the pinions G H I which at their face $g$ have been arrested by the stop R occupy a position such that the pinion I is opposite the crown J, but separated therefrom at a distance which allows the insertion of the idler pinion P; the movement of the housing E continuing in the direction x, the pinion P is interposed between the pinion I and the toothed crown J and the transmission is thus effected in a reverse direction. When the housing E is returned in the opposite direction, the catch F once more engages the shaft A and connects it to the housing for the ordinary working of the three forward speeds.

Fig. 6 represents a modification of the cam device for operating the housing E and shaft A. In this construction the cam consists of a plate N¹ of a shape suitably designed to impart to the housing the desired longitudinal and lateral motions; the housing carries two rollers e³ engaging the two faces of the plate-cam N¹ and prevented from disengaging therefrom by means of a double flange n² which forms its periphery.

The invention is not limited to details of construction and evidently may be carried out with variations and modifications not affecting its essential characteristics. Although it has been described in its application to a motor car, it may also be employed for bicycles, motor cycles and similar machines.

In the case of a bicycle, for example, the shaft A A¹ instead of being connected to the motor as before described, might be connected by bevel-pinion to the driving wheel and carry the sliding member fitted with pinions at the part near the bottom bracket or pedaling gear, the toothed crown J being secured to the latter.

Having thus described our invention, what we claim as such and desire to secure by Letters Patent is:—

1. A change speed gear for motor cars, motor cycles, and like, comprising a driven axle, a toothed wheel secured upon said axle, a driving shaft having a universal joint, a number of change speed pinions capable of sliding on the said driving shaft and driving the said toothed wheel, means for moving laterally said universally jointed shaft to disengage said pinions from said wheel and for sliding longitudinally the number of pinions when these pinions have been disengaged from with the toothed wheel.

2. A change speed gear for motor cars, motor cycles and like comprising a driven axle, a toothed wheel secured upon said axle, a driving shaft having a universal joint, and a member capable of sliding longitudinally on said shaft, a number of change speed pinions on this sliding member for driving the said toothed wheel, means for moving laterally the said universally jointed shaft with its sliding member to disengage said pinions from said wheel and for moving longitudinally the sliding member and its change speed pinions.

3. A change speed gear, comprising a driven axle, a toothed crown secured upon said axle, a driving shaft having a universal joint, a member capable of sliding longitudinally on said shaft, a number of change speed pinions on this sliding member, and a cam device by which the sliding member may be displaced to mesh one or other of its pinions with the toothed crown, this shaft with its sliding member receiving from the said cam a longitudinal movement for the passage from one pinion to the other and also a lateral displacement so as completely to disengage the pinion of the sliding member from the toothed crown in order to allow the said longitudinal movement.

4. A change speed gear for motor cars, etc., comprising a longitudinal driving shaft with universal joint, a driven axle, a toothed crown wheel thereon, change speed pinions on the rear end of said shaft and means for moving said rear end of the shaft longitudinally and also laterally to engage said pinions with, and disengage them from, the crown wheel.

5. A change speed gear for motor cars, etc., comprising a longitudinal driving shaft with universal joint, a driven axle, a toothed crown wheel thereon, change speed pinions on the rear end of said shaft, a rotatable shaft with two cams, one to move the shaft longitudinally and the other to move it laterally to effect the engagement and disengagement of one or other of the pinions with the crown wheel.

6. A change speed and reverse gear, comprising a driven member, a toothed wheel mounted on said member, a driving shaft, a number of change speed pinions on the latter, and longitudinally slidable as a whole, means for moving the pinions laterally towards and from the toothed wheel, an idler pinion and means for interposing the idler pinion between one of the other pinions and the toothed wheel.

In testimony whereof we have signed our names to this specification, in the presence of two subscribing witnesses.

MAURICE SIZAIRE.
LOUIS NAUDIN.

Witnesses:
  LÉON CRAUEKEN,
  GUSTAVE DUMONT.